US011438443B1

United States Patent
Wittmann et al.

(10) Patent No.: US 11,438,443 B1
(45) Date of Patent: Sep. 6, 2022

(54) SCALABLE COLLABORATIVE EDITING

(71) Applicant: Red Hat, Inc., Raleigh, NC (US)

(72) Inventors: Eric Philip Wittmann, Hartford, CT (US); Paolo Antinori, Milan (IT)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/196,571

(22) Filed: Mar. 9, 2021

(51) Int. Cl.
*G06F 15/16* (2006.01)
*H04L 67/60* (2022.01)
*H04L 67/1004* (2022.01)
*H04L 67/14* (2022.01)
*H04L 65/403* (2022.01)

(52) U.S. Cl.
CPC ............ *H04L 67/60* (2022.05); *H04L 65/403* (2013.01); *H04L 67/1004* (2013.01); *H04L 67/14* (2013.01)

(58) Field of Classification Search
CPC ... H04L 67/32; H04L 67/403; H04L 67/1004; H04L 67/14
See application file for complete search history.

(56) References Cited

U.S. PATENT DOCUMENTS

| | | | |
|---|---|---|---|
| 9,354,928 B1 * | 5/2016 | Buchheit | H04L 29/08072 |
| 2015/0081773 A1 * | 3/2015 | Ansel | G06F 16/958 |
| | | | 709/203 |
| 2021/0176304 A1 * | 6/2021 | Muthiah | H04L 67/1021 |

OTHER PUBLICATIONS

Author unknown; Deploying IBM Docs 1.0.6; 2016; 126 pages; IBM.
Boccadoro et al.; IBM Connections Docs From Zero to Hero; 2016; 15 pages; IBM.
Haywood; How to route traffic for a collaborative editing system in Node.js; 2017; 2 pages.
Valim; Real-time collaboration with Elixir at Slab; Nov. 17, 2020; 5 pages; elixir.

* cited by examiner

*Primary Examiner* — Ryan J Jakovac
(74) *Attorney, Agent, or Firm* — K&L Gates LLP

(57) ABSTRACT

Systems and methods for scalable collaborative editing are generally described. In various examples, a first collaborative editing session may be executed at a first node of a first cluster of compute nodes. A load balancer executing on the first cluster of compute nodes may receive a first request from a first computing device. In various examples, the first request may include first identifier data identifying the first collaborative editing session. In some examples, the load balancer may determine that the first identifier data is associated with the first collaborative editing session. Further, the load balancer may determine that the first collaborative editing session is assigned to the first node. In some examples, the first request may be sent to the first node.

19 Claims, 8 Drawing Sheets

SCALABLE COLLABORATIVE EDITING

BACKGROUND

The present disclosure generally relates to shared computing environments such as single or multi-tenant cloud environments. Shared computing environments, whether public or privately implemented within an organization, typically employ orchestration of the deployment of isolated guest computing instances that perform the computing tasks in the networked computer systems. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications, and may be deployed in a variety of hardware environments. Multiple guests may also be clustered together to perform a more complex function than the respective containers are capable of performing individually. In some examples, collaborative editing software may be deployed in cloud computing environments.

SUMMARY

The present disclosure provides a new and innovative system, methods and apparatus enabling scalable collaborative editing in a cloud computing environment. In various examples, the methods may include executing a first collaborative editing session at a first node of a first cluster of compute nodes. In some examples, the methods may include receiving, by a load balancer executing on the first cluster of compute nodes, a first request from a first computing device. In some examples, the first request may include first identifier data identifying the first collaborative editing session. In various further examples, the load balancer may determine that the first identifier data is associated with the first collaborative editing session. In at least some examples, the load balancer may determine that the first collaborative editing session is assigned to the first node. In various cases, the first request may be sent to the first node.

In another example, a system may include a first cluster of compute nodes including a first node. In some cases, the first node may be configured to execute a first collaborative editing session. In some examples, there may be a load balancer executing on the first cluster of compute nodes. In some examples, the load balancer may be configured to receive a first request from a first computing device. In various examples, the first request may include first identifier data identifying the first collaborative editing session. In some examples, a determination may be made that the first identifier data is associated with the first collaborative editing session. In some further examples, a determination may be made that the first collaborative editing session is assigned to the first node. In various examples, the load balancer may be further configured to send the first request to the first node.

In yet another example, another method of enabling scalable collaborative editing in a cloud computing environment is generally described. In some examples, a first collaborative editing session may be deployed on a first node of a first cluster of compute nodes. In some cases, first data may be sent to a load balancer of the first cluster of compute nodes. The first data may include first resource identifier data identifying the first collaborative editing session from among other collaborative editing sessions. In various examples, the first data may associate the first collaborative editing session with the first node. In some examples, a second collaborative editing session may be deployed on a second node of the first cluster of compute nodes. In some cases, second data may be sent to the load balancer. The second data may include second resource identifier data identifying the second collaborative editing session from among other collaborative editing sessions. Further, in some examples, the second data may associate the second collaborative editing session with the second node.

Additional features and advantages of the disclosed method and apparatus are described in, and will be apparent from, the following Detailed Description and the Figures.

DETAILED DESCRIPTION OF EXAMPLE EMBODIMENTS

Figure 1:
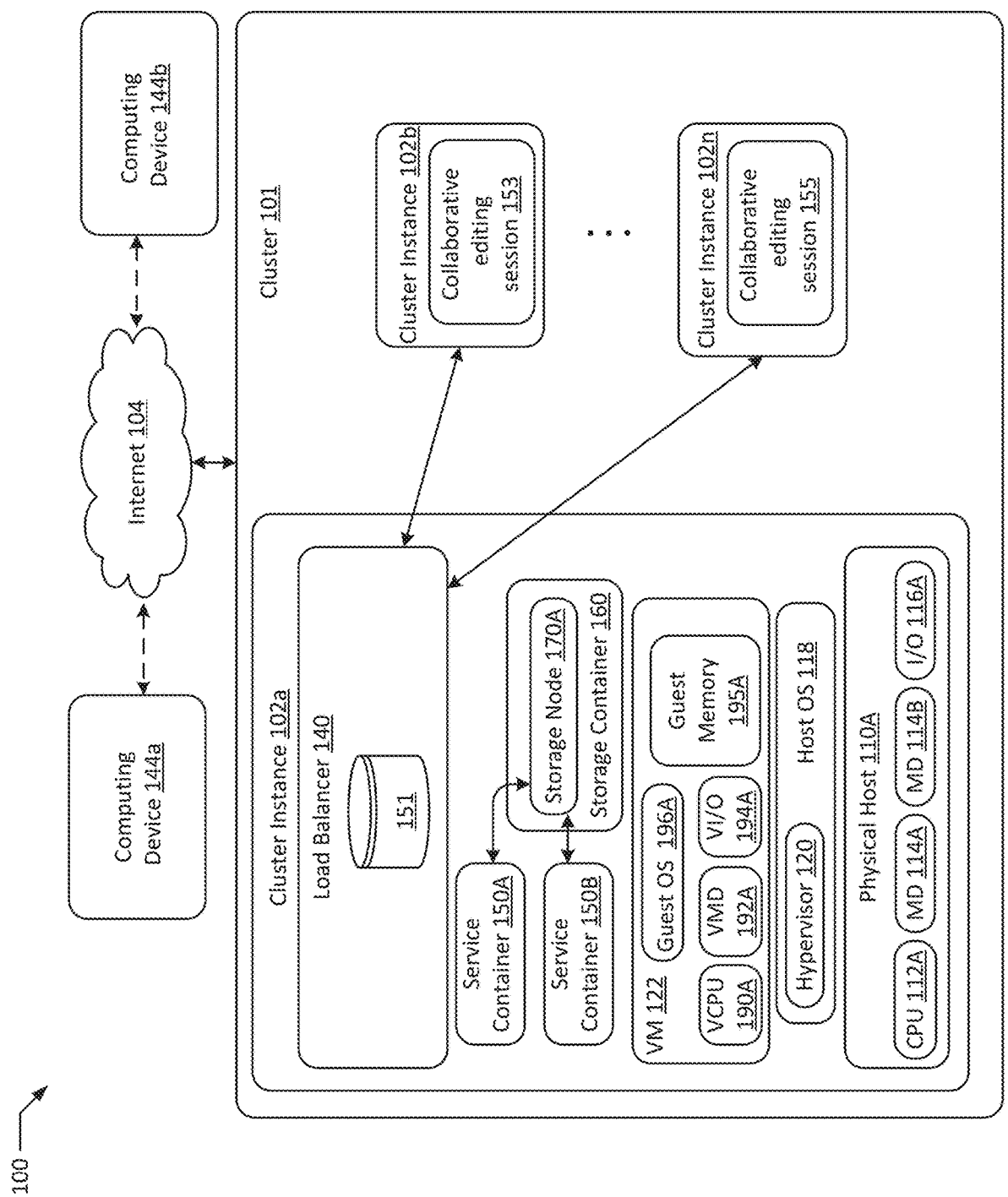
FIG. 1 is a block diagram of a system including a load balancer executing on a cluster configured to enable scalable collaborative editing, according to various examples of the present disclosure.

In computer systems, virtualization may be implemented to allow for flexible scaling of computing resources, for example, in a cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat® OpenShift®, Kubernetes®, Docker Swarm®), generally respond to frequent container startups and cleanups with low latency. Containers may enable wide spread, parallel deployment of computing power for specific tasks. In a typical example, a container may be instantiated to process a specific task and reaped after the task is complete.

Some web based software applications (often referred to as "web applications" or simply "web apps") offer collaborative editing capabilities, where multiple users may connect to a collaborative editing session (e.g., hosted on a virtualized computing environment executing collaborative editing software) and collaborate on a task, such as editing the content. Changes made by one user are persisted and are relayed to other users collaborating on the task. For example, Apicurio Studio is a collaborative editing web application allowing users to collaboratively edit application programming interface (API) designs. In web applications that support collaborative editing, when a change is received from one client (e.g., a user), the change is communicated to other clients that are connected to the same collaborative editing session. Accordingly, in collaborative editing the server hosting the collaborative content is typically responsible for coordinating content-change messages across multiple connected users.

When a server is executing on only a single compute node, the challenge of communicating content-change messages to connected client devices is relatively trivial. However, in cloud computing environments, server processes may be shared among a cluster of compute nodes that are organized using container orchestration and/or other cloud management software. If collaborative editing functionality is to be scaled to a large number of users (e.g., potentially thousands of users participating in a large number of collaborative editing sessions), eventually a single server instance of the collaborative editing application offers insufficient compute resources to provide such large scale collaborative editing to a large and fluctuating number of concurrently-connected clients.

Accordingly, in a scalable implementation, many instances of the collaborative editing application may be provided across multiple server instances. However, edits to collaboratively edited content need to be persisted so that other users connected to and/or collaboratively editing the content can see and interact with the changes. Accordingly, if there are multiple server instance replicas executing multiple instances of a collaborative editing session, the state data describing different user edits needs to be shared among the different server instance replicas so that all connected users see the same content.

One possible solution to the problem of scalable collaborative editing may be to use a messaging system to provide inter-node communication between the different server instance replicas executing the multiple instances of the collaborative editing session. For example, Apache Kafka®, Java™ Messaging System (JMS), and/or other messaging systems may be used to establish communication between different compute nodes of a cluster of compute nodes. Such messaging systems can be used to communicate state changes between different collaborative editing application nodes so that content edits in a collaborative editing session may be propagated to all concurrently connected clients. However, this solution requires deployment of a message broker. The message broker needs to be highly available to network traffic and potentially may need to be horizontally scaled among different compute nodes in the cluster, leading to significant additional operational complexity.

Accordingly, described herein are various systems and techniques that enable scalable collaborative editing sessions and which do not require use of a messaging system to provide inter-node communication. In various examples described herein, a load balancer executing on a cluster of compute nodes may route connections for a particular instance of a collaborative editing session (e.g., a collaboratively edited document) to the same compute node so that no inter-node messaging is required in order to maintain consistent state data for the collaborative editing session. Changes to the collaboratively edited content may be sent out to all collaborators by the single node hosting the collaborative editing session.

A load balancer is software executing on a cluster of compute nodes that routes network traffic to various compute nodes of the cluster to optimize for one or more processing goals (e.g., to minimize latency and/or network congestion, maximize processing efficiency by routing to available compute nodes/pods, etc.). In the Kubernetes® orchestration software, for example, an ingress controller may implement a load balancer that may be configured to perform the various techniques described herein in order to route network traffic directed to a particular collaborative editing session to the same compute node.

Load balancers typically offer a feature known as "session affinity." Session affinity is a technique used by load balancers to ensure that all connections from the same user are routed to the same node/pod, which is necessary when an application is stateful (e.g., uses and persists state data over time) and the application state only exists in the memory of a single node. In this case, the user needs to be connected to the same node/pod each time, for every connection made, so that the user's individual state remains accessible throughout their web browsing session (or other stateful session).

Session affinity typically works by the server or load balancer generating a unique session identifier (e.g., a unique user identifier (UUID)) the first time a unique user connects. This session identifier is sent back to the user from the server/load balancer in the hypertext transfer protocol (HTTP) response (e.g., as a cookie). This session identifier is sent by the user every time the user connects to the server within that session to maintain the user's individual state throughout the session.

In the various systems and techniques described herein, a unique identifier is associated with each collaborative editing resource (e.g., with each collaborative editing session, such as with each collaboratively-edited document, spreadsheet, etc.) rather than with the user (as in session affinity). In some examples, the unique identifier may be extracted from the connection to the particular collaborative editing session (e.g., from the uniform resource locator (URL) path or from a query parameter identifying the collaborative editing session). Client devices may include the unique identifier in requests to connect to the collaborative editing session. The load balancer may use the unique identifier to determine the collaborative editing session associated with that identifier and to determine the compute node executing that collaborative editing session. Accordingly, the load balancer may route the requests to the single compute node executing the collaborative editing session. Accordingly, rather than being an affinity that is based on the user, the affinity may be based on the collaborative editing resource. Accordingly, a load balancer may be effective to use the collaborative editing session unique identifier to route requests from all users participating in the same collaborative editing session to the node on which the collaborative editing session is being executed.

FIG. 1 is a block diagram of a system 100 including a load balancer 140 executing on a cluster 101 (e.g., an Open- Shift® cluster) that is configured to enable scalable collaborative editing, according to various examples of the present disclosure. In various examples, computing devices 144a, 144b may be client computing devices that may have access privileges to a collaborative editing session (e.g., to access and/or make edits to the collaborative content). Computing devices 144a, 144b may be configured in communication with one another and/or with cluster 101 via the Internet 104. In the example, depicted in FIG. 1, the cluster instance 102a may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeB SD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod).

For example, load balancer 140 may be deployed on cluster instance 102a and may include and/or may be configured in communication with a database 151. Database 151 may store identifier data that identifies various collaborative editing sessions (such as collaborative editing sessions 153, 155). Additionally, database 151 may store information identifying the cluster instance on which the different collaborative editing sessions are executing. For example, database 151 may store data that indicates that cluster instance 102b is executing collaborative editing session 153, and data that indicates that cluster instance 102n is executing collaborative editing session 155. In some examples, database 151 may store websocket connection data indicating a network path to the particular collaborative editing session. Websocket connections may be full duplex communication channels operating over hyper text transfer protocol (HTTP) through a single TCP/IP socket connection. For example, database 151 may store unique identifier data that identifies collaborative editing session 153 in association with websocket connection data indicating a network path for sending data traffic to the collaborative editing session 153 (executing on cluster instance 102b). Similarly, database 151 may store unique identifier data that identifies collaborative editing session 155 in association with websocket connection data indicating a network path for sending data traffic to the collaborative editing session 155 (executing on cluster instance 102n). Accordingly, if a request is received from computing device 144a or computing device 144b that includes the unique identifier data associated with collaborative editing session 153, load balancer 140 may use the unique identifier data as a search query to search database 151 to lookup the collaborative editing session (e.g., collaborative editing session 153) that is associated with that unique identifier data. Additionally, load balancer 140 may determine the appropriate cluster instance and/or the websocket connection data so that the request from the computing device 144a, 144b may be routed to the correct collaborative editing session 153 that corresponds to the unique identifier data.

In some examples, a given service may require the deployment of multiple VMs, containers and/or pods in multiple physical locations. In an example, VM 122 may be a VM executing on physical host 110A. Cluster instance 102a may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VIVID 192A, and VI/O 194A. Processor virtualization may be implemented by the hypervisor 120 scheduling time slots on physical CPUs 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A. In an example, storage container 160 and/or service containers 150A, 150B are similarly implemented.

In an example, in addition to distributed storage provided by storage container 160, a storage controller may additionally manage storage in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to an orchestrator of the cluster 101. In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

As used herein, a cluster instance (e.g., cluster instances 102a, 102b, . . . , 102n) represents a set of software processes that are grouped and run together within a cluster. Advantageously, such cluster instances running in OpenShift allow these processes to be moved together within the cluster and still be accessible. In the example of FIG. 1, collaborative editing sessions 153, 155 are executed by cluster instances 102b and 102n, respectively. However, these collaborative editing sessions may be moved to other appropriate hosts in the cluster. In order to maintain affinity when a collaborative editing session is moved to a new cluster instance, the database 151 of load balancer 140 is updated to associate the collaborative editing session's unique identifier with the new cluster instance. Accordingly, requests from collaborators of the collaborative editing session may be routed to the new cluster instance by including the collaborative editing session's unique identifier in their requests.

Figure 2:
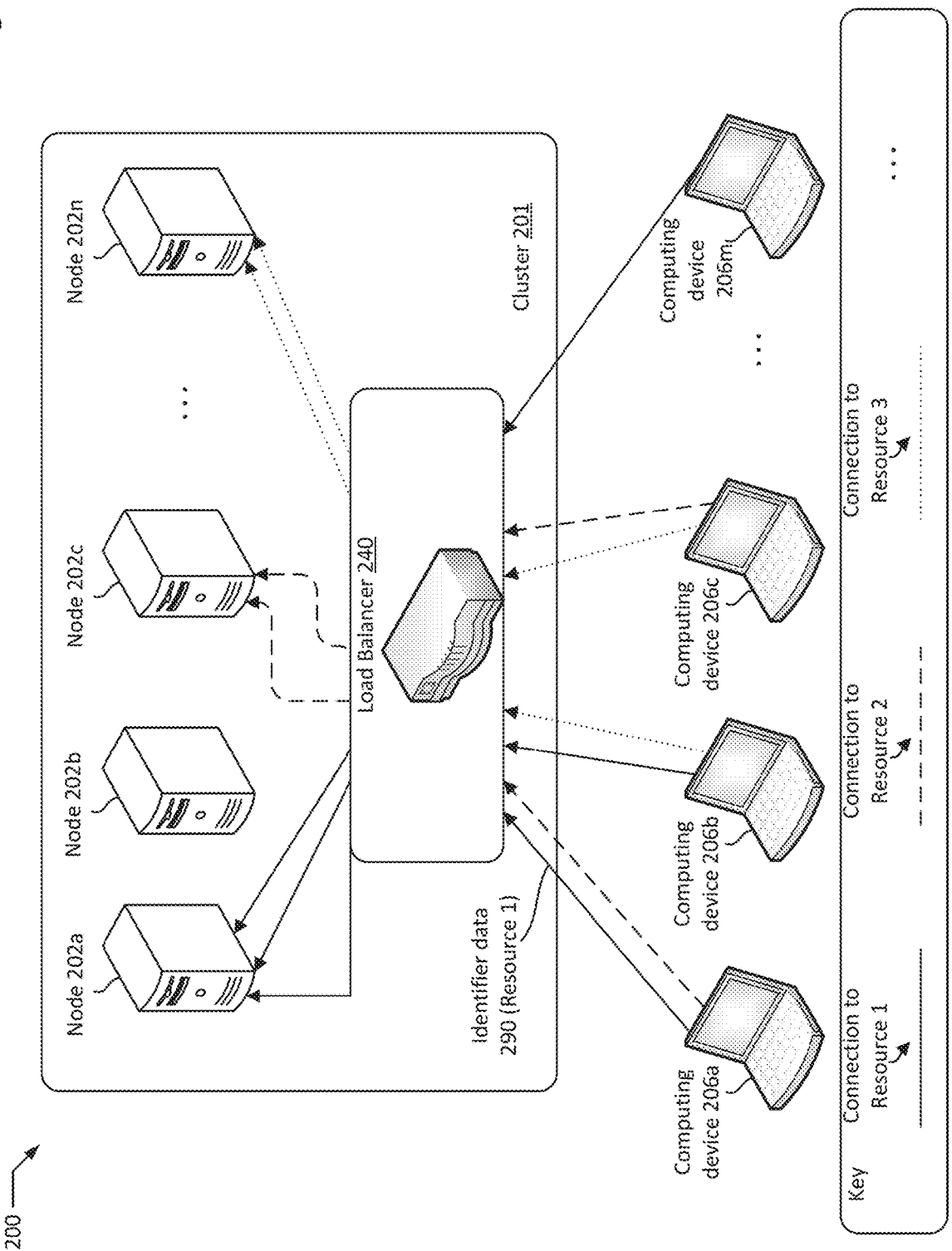
FIG. 2 is a block diagram illustrating communication between a load balancer and various nodes executing on a cluster, in accordance with various aspects of the present disclosure.

FIG. 2 is a block diagram illustrating a system 200 exhibiting communication between a load balancer 240 and various nodes executing on a cluster, in accordance with various aspects of the present disclosure. In the example, computing devices 206a, 206b, 206c, . . . , 206m may be privileged to access one or more collaborative editing sessions hosted by nodes 202a, 202b, 202c, . . . , 202n on cluster 201. In various examples, any given collaborative editing session may be hosted by only a single one of the nodes 202a, 202b, 202c, . . . , 202n. In order to connect to a particular collaborative editing session, a computing device may send unique identifier data that uniquely identifies that collaborative editing session from among the other collaborative editing sessions to load balancer 240. Load balancer 240 may use the unique identifier data to lookup the particular node that is executing that collaborative editing session (e.g., from database 151).

In the example depicted in FIG. 2, the patterns of the lines connecting computing devices 206a, . . . , 206m to load balancer 240 and load balancer 240 to nodes 202a, . . . , 202n may represent the connection to a particular collaborative editing session (e.g., Resource 1, 2, 3, . . . ). Since each distinct collaborative editing session is only executed on one node, each pattern of the lines also corresponds to no more than a single node among nodes 202a, 202b, 202c, . . . , 202n. Additionally, since each distinct collaborative editing session is associated with a unique identifier (e.g., a resource identifier) each pattern of the lines also corresponds to a distinct unique identifier.

In the example depicted in FIG. 2, computing device 206a may be privileged to collaborate in two different collaborative editing sessions (corresponding to Resource 1 (a solid line) and Resource 2 (a first dashed line pattern)). As an example, Resource 1 and Resource 2 may be collaboratively edited documents (such as Google Docs™). Resource 1 (the solid line pattern) is hosted by node 202a. Accordingly, computing device 206a may send identifier data 290 that identifies Resource 1 (e.g., a particular Google Doc™ or other collaborative editing session) to load balancer 240. The identifier data 290 may be, for example, a unique identifier that identifies the particular collaborative editing session of Resource 1. In some examples, the identifier data 290 may be included in a packet header of requests made to connect to and/or edit the Resource 1 (e.g., a collaborative editing content). In some other examples, the identifier data 290 may be included in the URL of a request directed to the collaborative editing session (e.g., as a part of the file path of the request). In response to receipt of the identifier data, load balancer 240 may perform a lookup to determine the relevant node that is associated with the identifier data 290 and Resource 1. In the current example, the identifier data 290 corresponds to node 202a, accordingly, the request from computing device 206a may be sent by load balancer 240 to node 202a.

Similarly, in order to send data (e.g., content edit requests) to Resource 2 (e.g., another Google Doc™ or other collaborative editing session) computing device 206a may send identifier data that identifies Resource 2 to load balancer 240. Load balancer 240 may perform a lookup using the identifier data that identifies Resource 2 (or may otherwise identify the correct network path from the identifier data) to determine that node 202c is associated with Resource 2. Accordingly, load balancer may send the data (e.g., the content edit requests) to node 202c.

In the example of FIG. 2, computing device 206b is participating in collaborative editing sessions associated with Resource 1 and Resource 3, computing device 206c is participating in collaborative editing sessions associated with Resource 2 and Resource 3, and computing device 206m is participating in collaborative editing sessions with Resource 1. In order to send traffic to a particular collaborative editing session, a computing device sends the identifier data that identifies that resource to the load balancer

240. The load balancer 240, in turn, determines the node that is associated with that resource and sends the traffic to the appropriate node.

Figure 3:
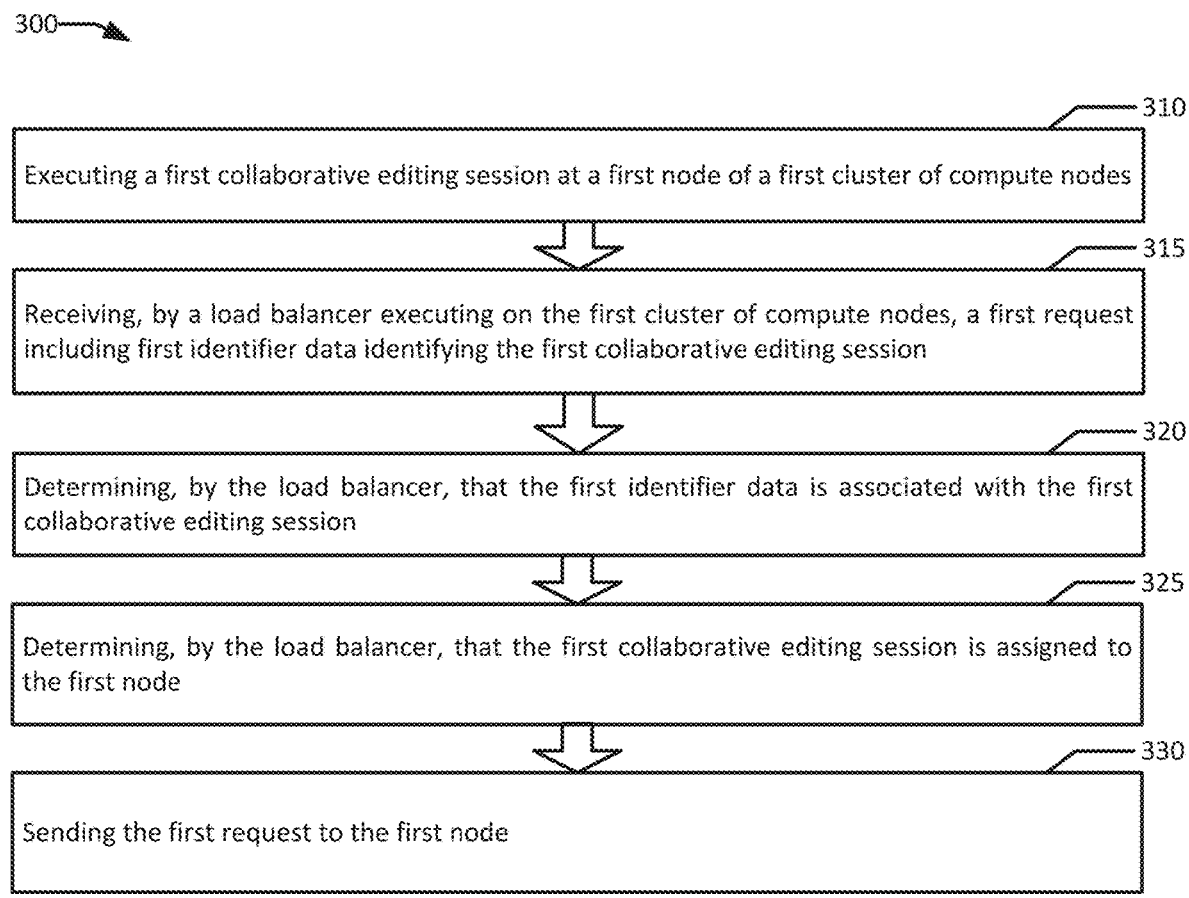
FIG. 3 is flowchart illustrating an example process for scalable collaborative editing in a multi-node computing environment, according to an example of the present disclosure.

FIG. 3 is flowchart illustrating an example process 300 for scalable collaborative editing in a multi-node computing environment, according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes executing a first collaborative editing session at a first node of a first cluster of compute nodes (block 310). For example, a first collaborative editing session may be a collaboratively edited document (e.g., an Apicurio Studio API design document) that may be executed by a first node of an OpenShift cluster of compute nodes. A number of client computing devices may be associated with users that are collaboratively editing (or are privileged to collaboratively edit) the first collaborative editing session.

In an example, the process 300 may include receiving, by a load balancer executing on the first cluster of compute nodes, a first request including first identifier data identifying the first collaborative editing session (block 315). For example, load balancer 140 may be executing on cluster 101. Load balancer 140 may receive a first request from a computing device (e.g., computing device 144*a*). The first request may include first identifier data (e.g., identifier data 290 of FIG. 2) that may identify the first collaborative editing session (e.g., collaborative editing session 153).

In an example, the process 300 may include determining, by the load balancer, that the first identifier data is associated with the first collaborative editing session (block 320). For example, the load balancer 140 may perform a lookup of database 151 using the first identifier data as a query. The load balancer 140 may determine that the first collaborative editing session (e.g., collaborative editing session 153) is associated with the first identifier data. For example, an entry in database 151 may associate the first identifier data with the first collaborative editing session. In various other examples, the first identifier data may be a part of a network path that pertains to the first collaborative editing session.

In an example, the process 300 may include determining, by the load balancer, that the first collaborative editing session is assigned to the first node (block 325). For example, the load balancer 140 may determine that the first collaborative editing session (e.g., collaborative editing session 153) is assigned to the first node (e.g., cluster instance 102*b*). In various examples, an entry in database 151 may indicate that the first collaborative editing session (e.g., collaborative editing session 153 and/or Resource 1 (FIG. 2)) is associated with the first node (e.g., cluster instance 102*b* (FIG. 1) or node 202*a* (FIG. 2)).

In an example, the process 300 may include sending the first request to the first node (block 330). For example, after determining the appropriate node that is associated with the collaborative editing session that is identified by the identifier data, the load balancer 140 may send the request to the appropriate node. In various examples, the first request may be a request to edit content of the collaborative editing session. For example, the first request may include executable instructions to perform user-specified edits to a collaboratively-edited document.

Figure 4:
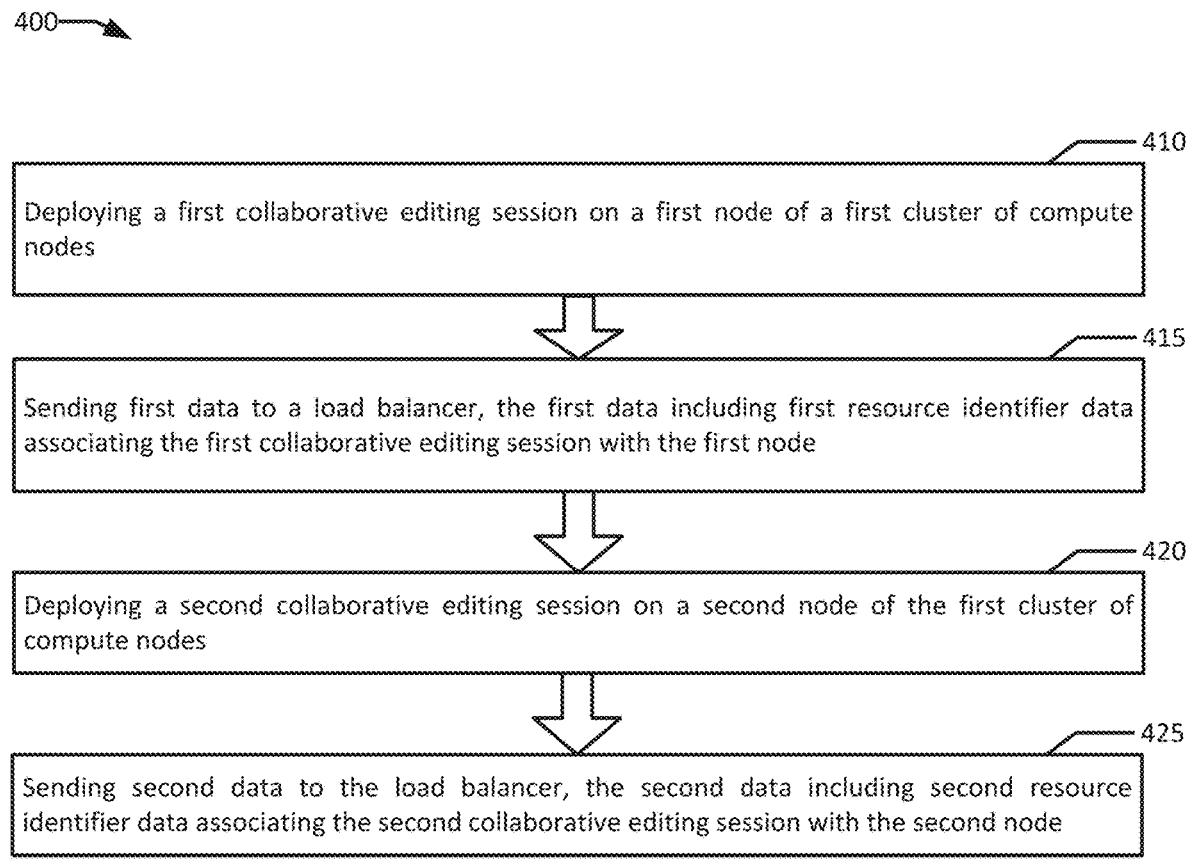
FIG. 4 is flowchart illustrating an example process for enabling scalable collaborative editing, according to an example of the present disclosure.

FIG. 4 is flowchart illustrating an example process 400 for enabling scalable collaborative editing, according to an example of the present disclosure. In various examples, the process 400 of FIG. 4 may be executed by at least one processor of a cluster of compute nodes/instances (e.g., cluster 101). Although the example process 400 is described with reference to the flowchart illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described may be optional. The process 400 may be performed by processing logic that may comprise hardware (circuitry, dedicated logic, etc.), software, or a combination of both. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

In the example, process 400 may include deploying a first collaborative editing session on a first node of a first cluster of compute nodes (block 410). For example, a first collaborative editing session (e.g., Resource 1, Resource 2, etc., of FIG. 2) may be deployed on a first node (e.g., node 202*a*) of a first cluster (e.g., cluster 201) of compute nodes. Deploying the collaborative editing session may include launching one or more containers configured to execute the services that constitute the first collaborative editing session.

In the example, process 400 may further include sending first data to a load balancer, the first data including first resource identifier data associating the first collaborative editing session with the first node (block 415). For example, first data may include the first resource identifier data (e.g., identifier data 290 identifying Resource 1 in FIG. 2). In various examples, the first resource identifier data may identify a particular resource (e.g., a particular collaborative editing session). The first resource identifier data may be stored by the load balancer 240 in a database (e.g., database 151) in association with data identifying the node that is executing the first collaborative editing session.

In the example, process 400 may further include deploying a second collaborative editing session on a second node of the first cluster of compute nodes (block 420). For example, a second collaborative editing session (e.g., Resource 3, etc., of FIG. 2) may be deployed on a second node (e.g., node 202*b*) of the first cluster (e.g., cluster 201) of compute nodes. As previously described, deploying the collaborative editing session may include launching one or more containers configured to execute the services that constitute the first collaborative editing session.

In the example, process 400 may further include sending second data to the load balancer, the second data including second resource identifier data associating the second collaborative editing session with the second node (block 425). For example, second data may include the second resource identifier data (e.g., identifier data corresponding to Resource 2 in FIG. 2). In various examples, the second resource identifier data may identify a different resource relative to the first resource identifier data (e.g., a different collaborative editing session that is executed on a different node). The second resource identifier data may be stored by the load balancer 240 in the database (e.g., database 151) in association with data identifying the node (e.g., node 202*c*) that is executing the second collaborative editing session.

Figure 5A:
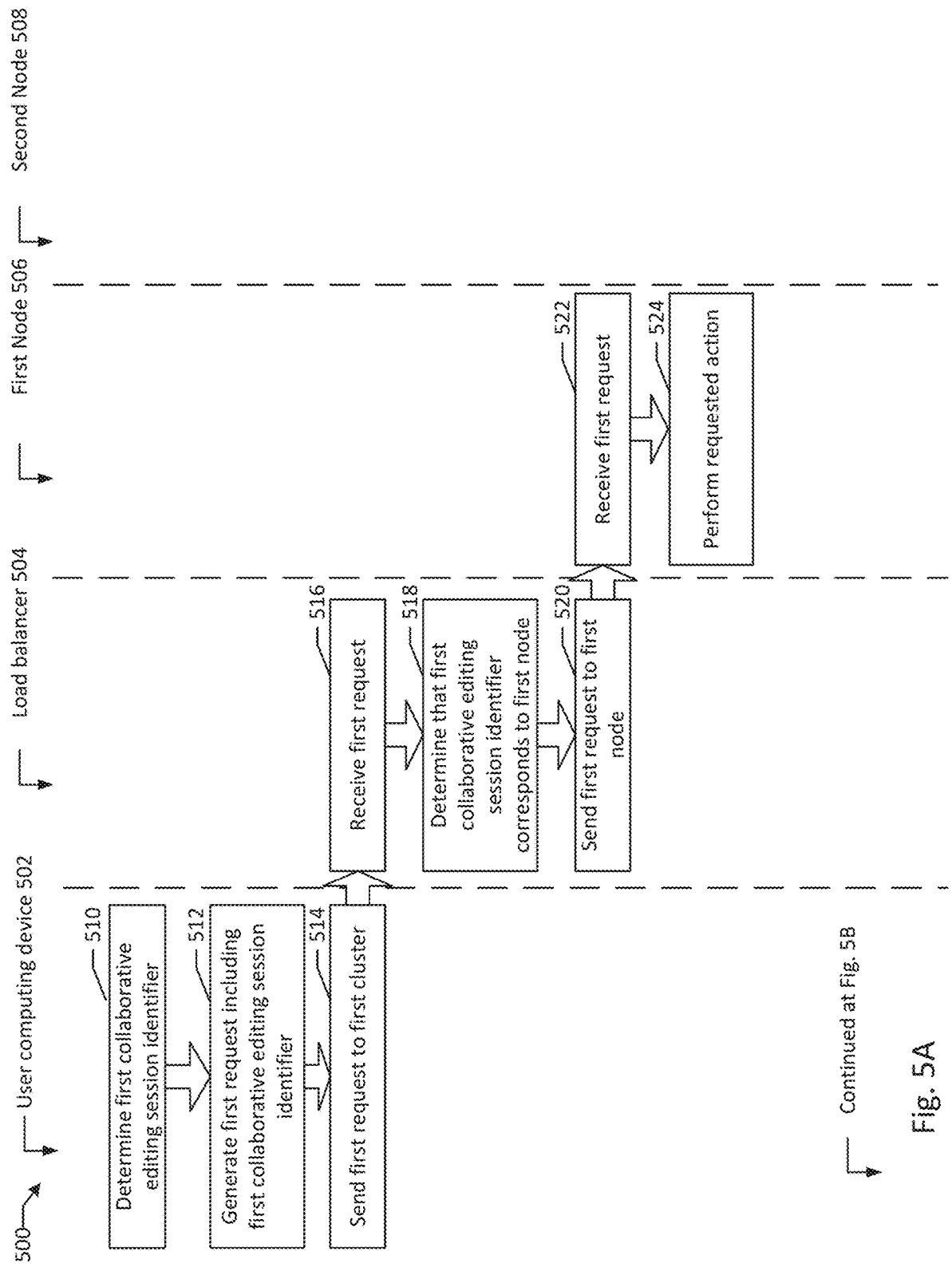
FIGS. 5A-5B illustrate a flow diagram of an example of collaborative editing using load balancer affinity according to various aspects of the present disclosure.
Figure 5B:
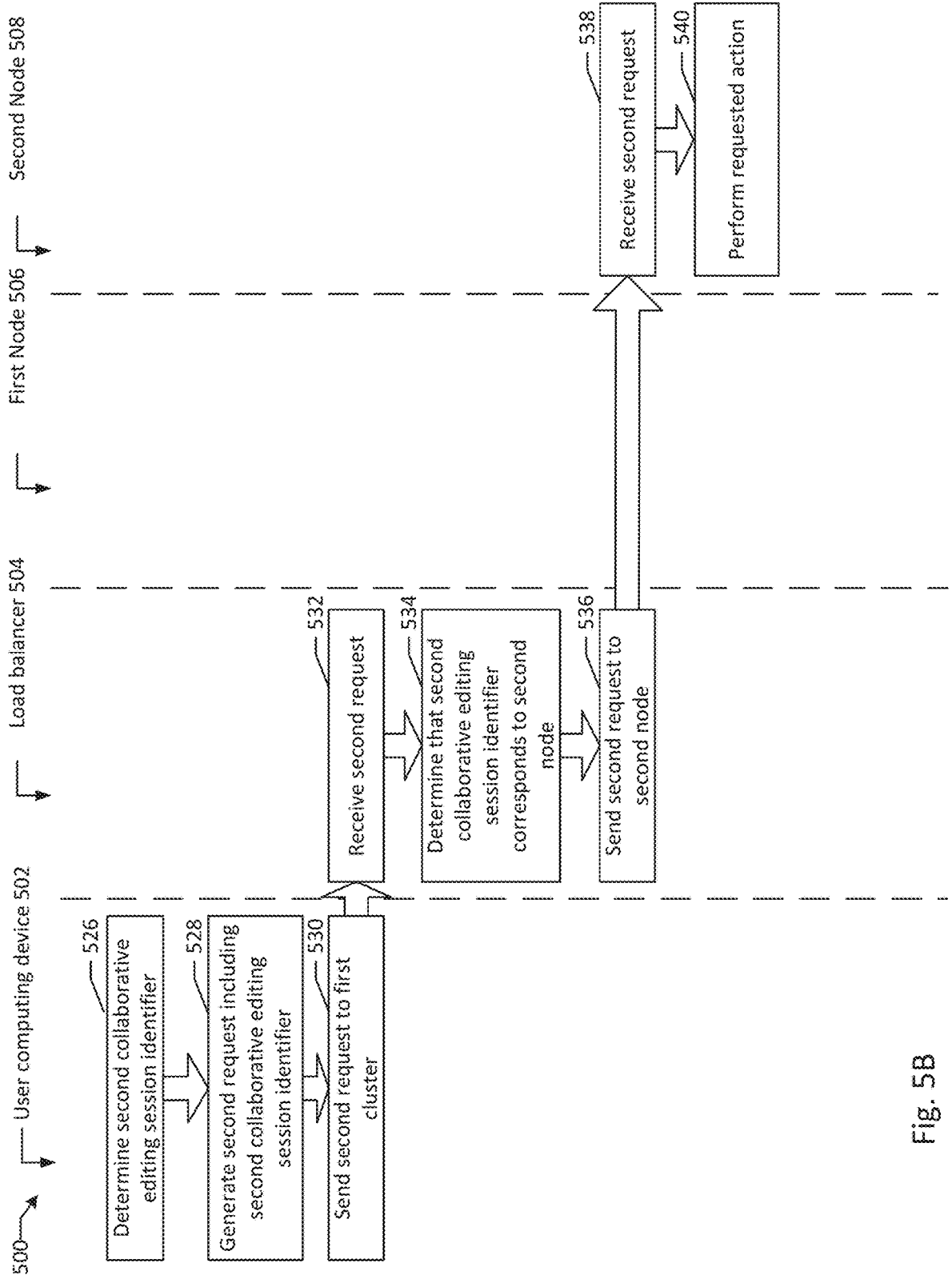

FIGS. 5A-5B illustrate a flow diagram of an example of collaborative editing using load balancer affinity according to various aspects of the present disclosure. Although the examples below are described with reference to the flow diagram illustrated in FIGS. 5A-5B, many other methods of performing the acts associated with FIG. 5A-5B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the illustrated example flow diagram 500, a user computing device 502 may determine a first collaborative editing session identifier (block 510). In various examples, when the user is invited to collaborate in the collaborative editing session and/or when the user creates a new collaborative editing session, a first collaborative editing session identifier may be provided to the user computing device 502. In various examples, collaborative editing session identifiers may be created when the collaborative editing session is created. As previously described collaborative editing session identifiers or other resource identifiers may be data that uniquely identifies the collaborative editing session from among other resources (e.g., other collaborative editing sessions). The user computing device 502 may generate a first request including the first collaborative editing session identifier (block 512). In various examples, the first request may be a request to connect to the collaborative editing session (e.g., to open a collaboratively edited document) or may be a request to perform some action (e.g., a request to perform an edit) in the collaborative editing session. The user computing device 502 may send the first request to the first cluster at which the collaborative editing session is being hosted (block 514).

A load balancer 504 may receive the first request (block 516). The load balancer 504 may parse the first request and may identify the first collaborative editing session identifier that is included in the first request. As previously described, the first collaborative editing session identifier may be included as metadata in the request (e.g., in a packet header) or may be included in the file path (e.g., the URL) to which the request is directed. The load balancer 504 may determine that the first collaborative editing session identifier corresponds to the first node (block 518). For example, load balancer 504 may use the first collaborative editing session identifier to query a data structure. The first collaborative editing session identifier may identify a particular collaborative editing session. The data structure may store data indicating a node on which the particular collaborative editing session is being hosted (e.g., on which the particular collaborative editing session is currently hosted). In the example depicted in flow diagram 500, the first collaborative editing session identifier may be associated with the first node 506 in the data structure. Accordingly, load balancer 504 may send the first request to the first node (block 520).

The first node 506 may receive the first request (block 522). The first request may include, for example, authentication data effective to authenticate the user computing device 502 to the first collaborative editing session, handshake data effective to establish communication between the user computing device 502 and the first collaborative editing session, and/or executable commands effective to take some action with respect to the first collaborative editing session. An example of such action may be, changes requested within a collaboratively edited document of the first collaborative editing session. Accordingly, the first node 506 may perform the requested action (block 524). For example, the first node 506 may perform a requested edit to the collaboratively-edited document of the first collaborative editing session hosted by the first node 506.

Processing of flow diagram 500 may continue at FIG. 5B. The user computing device 502 may determine a second collaborative editing session identifier (block 526). For example, the user computing device 502 may be privileged to access multiple collaborative editing sessions. As such, the second collaborative editing session identifier may correspond to a different collaborative editing session or different resource relative to the first collaborative editing session.

In various examples, when the user is invited to collaborate in a second collaborative editing session and/or when the user creates a new collaborative editing session, the second collaborative editing session identifier may be provided to the user computing device 502. The user computing device 502 may generate a second request including the second collaborative editing session identifier (block 528). In various examples, the second request may be a request to connect to a second collaborative editing session (e.g., to open a second collaboratively edited document) or may be a request to perform some action (e.g., a request to perform an edit) in the second collaborative editing session. The user computing device 502 may send the second request to the first cluster at which the second collaborative editing session is being hosted (block 530).

A load balancer 504 may receive the second request (block 532). The load balancer 504 may parse the second request and may identify the second collaborative editing session identifier that is included in the second request. The second collaborative editing session identifier may be included as metadata in the request (e.g., in a packet header) or may be included in the file path (e.g., the URL) to which the request is directed. The load balancer 504 may determine that the second collaborative editing session identifier corresponds to the second node (block 534). For example, load balancer 504 may use the second collaborative editing session identifier to query a data structure. The second collaborative editing session identifier may identify a particular collaborative editing session. The data structure may store data indicating a node on which the particular collaborative editing session is being hosted (e.g., on which the particular collaborative editing session is currently hosted). In the example depicted in flow diagram 500, the second collaborative editing session identifier may be associated with the second node 508 in the data structure. Accordingly, load balancer 504 may send the first request to the second node (block 536).

The second node 508 may receive the second request (block 538). The second request may include, for example, authentication data effective to authenticate the user computing device 502 to the second collaborative editing session, handshake data effective to establish communication between the user computing device 502 and the second collaborative editing session, and/or executable commands effective to take some action with respect to the second collaborative editing session. An example of such action may be, changes requested within a collaboratively edited document of the second collaborative editing session. Accordingly, the second node 508 may perform the requested action (block 540). For example, the second node 508 may perform a requested edit to the collaboratively-edited document (e.g., adding a line of code to an Apicurio Studio API design document) of the second collaborative editing session hosted by the second node 508.

Figure 6:
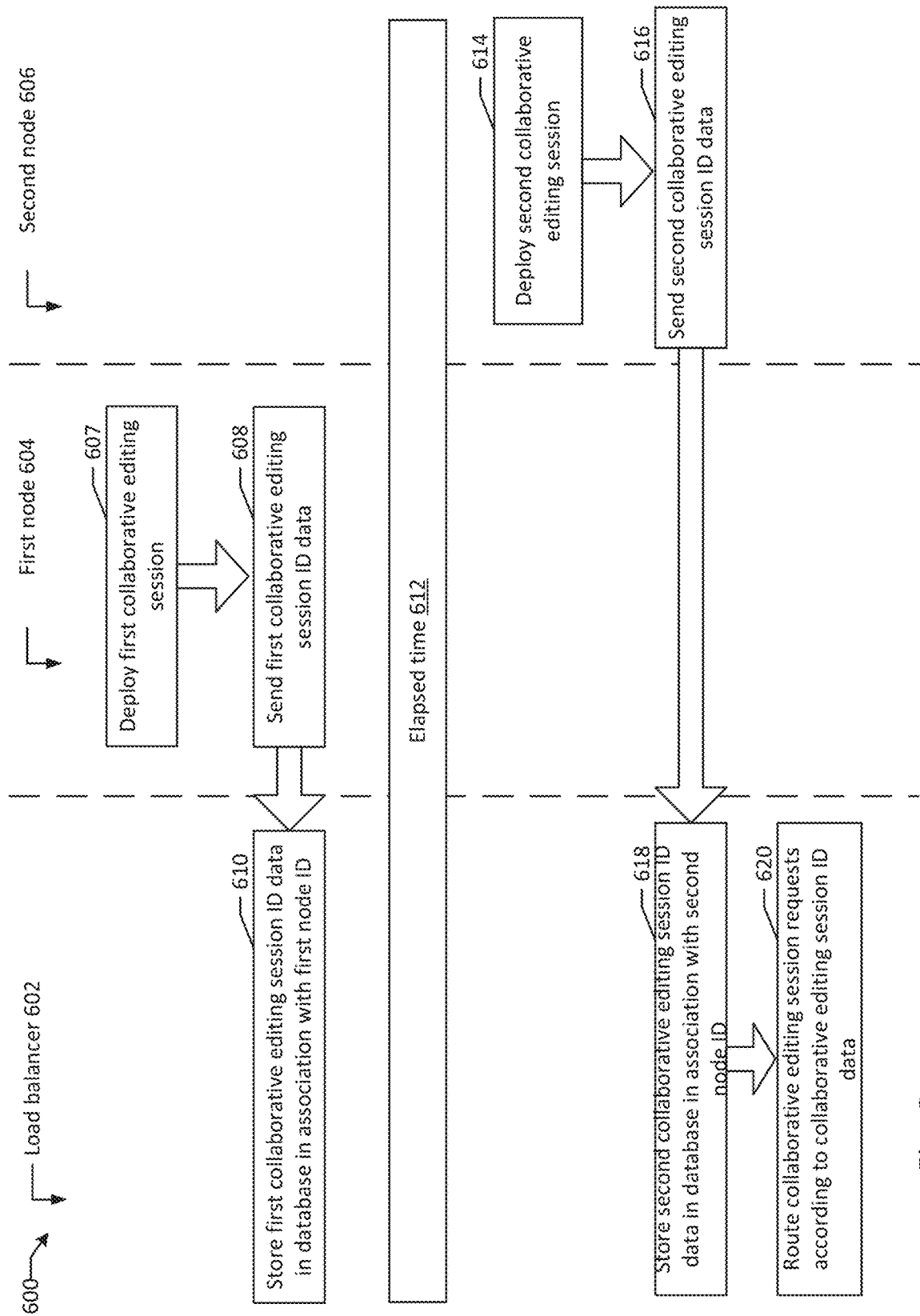
FIG. 6 illustrates a flow diagram of an example of establishing load balancer affinity for collaborative editing sessions according to various aspects of the present disclosure.

FIG. 6 illustrates a flow diagram 600 of an example of establishing load balancer affinity for collaborative editing sessions according to various aspects of the present disclosure. Although the examples below are described with reference to the flow diagram illustrated in FIG. 6, many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In an example, first node 604 may deploy a first collaborative editing session (block 607). In various examples, a user may provide instructions to a collaborative editing application hosted by the first node 604 to create a new collaboratively-edited document (or other resource). In various examples, the first node 604 may generate a new collaborative editing session in response to the user request. Additionally, the first node may create first collaborative editing session identifier data that uniquely identifies the newly-deployed first collaborative editing session (e.g., the first collaborative editing session) from among other collaborative editing sessions or other resources that are executing on the same cluster of compute nodes/instances. The first node 604 may send the first collaborative editing session identifier data to a load balancer 602 of the cluster of which the first node 604 is a part (block 608).

The load balancer 602 may store the first collaborative editing session identifier data in a database in association with first node identifier data (block 610). The first node identifier data may be data that identifies the first node from among other nodes of the cluster. In various examples, the first node identifier data may be a network address of the first node 604 and/or of the first collaborative editing session hosted by the first node 604. Accordingly, when load balancer 602 receives subsequent requests that include the first collaborative editing session identifier data, the load balancer 602 may perform a lookup to determine that the first collaborative editing session is being hosted by the first node 604. As such, state data for the first collaborative editing session may be maintained by the first node 604. Some amount of time may elapse (block 612) after storing the first collaborative editing session identifier data in the database in association with the first node identifier.

A second node 606 may deploy a second collaborative editing session (block 614). In various examples, a user may provide instructions to a collaborative editing application hosted by the second node 606 to create a new collaboratively-edited document (or other resource). In various examples, the second node 606 may generate a new collaborative editing session in response to the user request. Additionally, the second node may create second collaborative editing session identifier data that uniquely identifies the newly-deployed second collaborative editing session (e.g., the second collaborative editing session) from among other collaborative editing sessions or other resources that are executing on the same cluster of compute nodes/instances. The second node 606 may send the second collaborative editing session identifier data to the load balancer 602 of the cluster of which the first node 604 and second node 606 are a part (block 616).

The load balancer 602 may store the second collaborative editing session identifier data in a database in association with second node identifier data (block 618). The second node identifier data may be data that identifies the second node 606 from among other nodes of the cluster. In various examples, the second node identifier data may be a network address of the second node 606 and/or of the second collaborative editing session hosted by the second node 606. Accordingly, when load balancer 602 receives subsequent requests that include the second collaborative editing session identifier data, the load balancer 602 may perform a lookup to determine that the second collaborative editing session is being hosted by the second node 606. As such, state data for the second collaborative editing session may be maintained by the second node 606. Thereafter, the load balancer may route collaborative editing session requests according to the various collaborative editing session identifier data received in such requests (block 620). For example, the load balancer 602 may use collaborative editing session identifier data to lookup the appropriate node that hosts the particular resource (e.g., the particular collaborative editing session) that is identified by the collaborative editing session identifier data.

Figure 7:
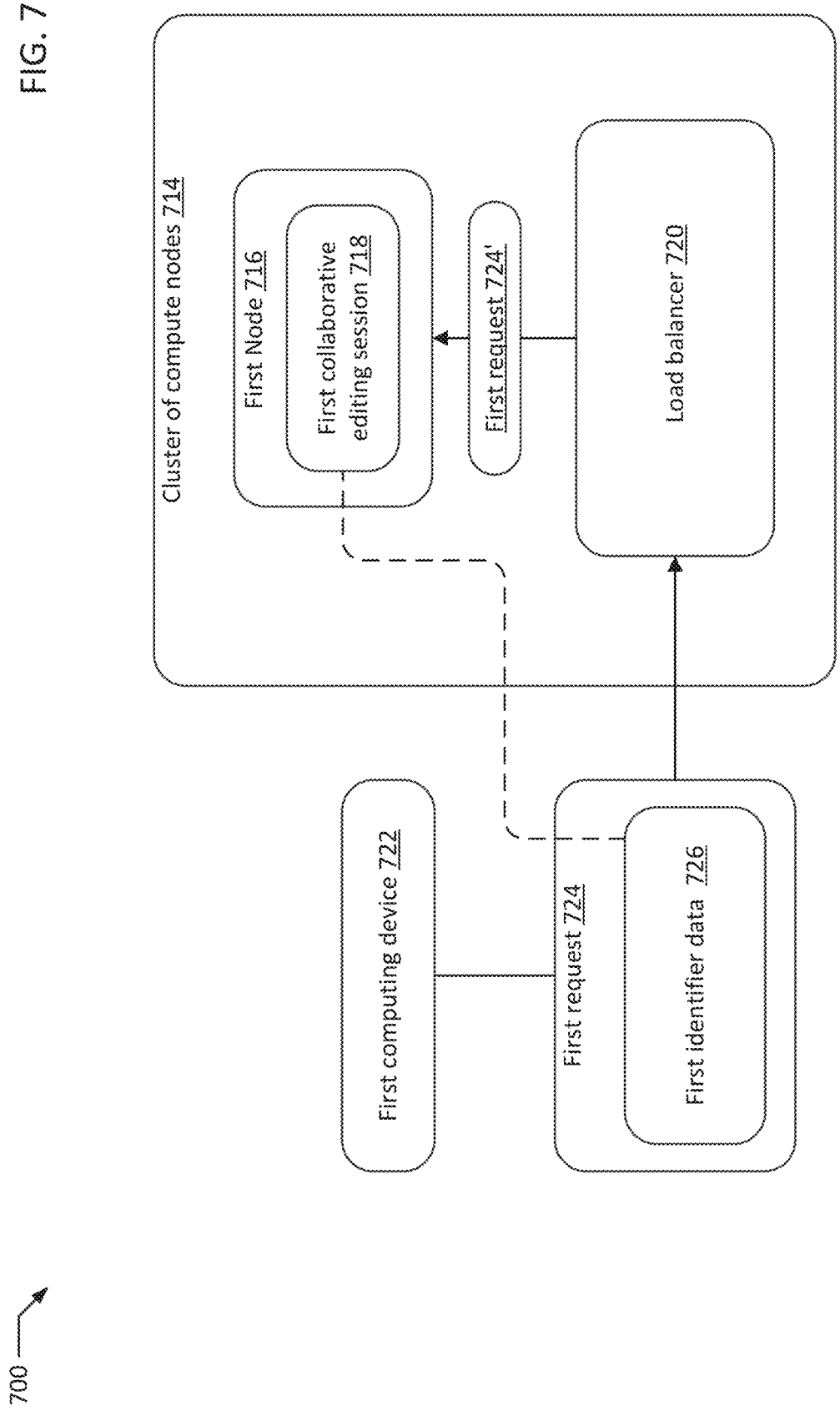
FIG. 7 is block diagram of a first computing device configured in communication with a cluster of compute nodes according to an example of the present disclosure.

FIG. 7 is block diagram 700 of a first computing device configured in communication with a cluster of compute nodes according to an example of the present disclosure. In various examples, a first computing device 722 may send a first request 724 to perform some action with respect to a first collaborative editing session 718 executed on a cluster of compute nodes 714. The first request 724 may include first identifier data 726. The first identifier data 726 may distinguish the first collaborative editing session 718 from among other collaborative editing sessions and/or other resources hosted by the cluster of compute nodes 714.

The first request 724 may be received by a load balancer 720 executing on the cluster of compute nodes 714. The load balancer 720 may be effective to route traffic to various nodes of the cluster of compute nodes 714 and/or to efficiently distribute incoming network traffic to different servers (e.g. compute nodes) of the cluster of compute nodes 714 according to the particular logic of the load balancer 720. The load balancer 720 may determine that the first identifier data 726 received as part of the first request 724 may identify the first collaborative editing session 718. The load balancer 720 may determine that the first identifier data 726 is associated with the first node 716 of the cluster of compute nodes 714. For example, the load balancer 720 may use the first identifier data 726 to lookup the node on which the first collaborative editing session 718 is executing, as described herein. After determining that the first collaborative editing session 718 is executing on the first node 716, the load balancer 720 may send the first request 724' received from the first computing device 722 to the first node 716. The requested action may be performed by the first node 716 (e.g., a user edit to a collaboratively-edited document of the first collaborative editing session 718).

All of the disclosed methods and/or procedures described herein may be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a $_1$st example aspect of the present disclosure, a method comprises executing a first collaborative editing session at a first node of a first cluster of compute nodes; receiving, by a load balancer executing on the first cluster of compute nodes, a first request from a first computing device, the first request comprising first identifier data identifying the first collaborative editing session; determining, by the load balancer, that the first identifier data is associated with the first collaborative editing session; determining, by the load balancer, that the first collaborative editing session is assigned to the first node; and sending the first request to the first node.

In accordance with a 2nd example aspect of the present disclosure, which may be used in combination with any one or more of other aspects described herein (e.g., the 1st aspect), receiving, by the load balancer, a second request from a second computing device, the second request comprising the first identifier data identifying the first collaborative editing session; and sending the second request to the first node.

In accordance with a 3rd example aspect of the present disclosure, which may be used in combination with any one or more of other aspects described herein (e.g., the 1st aspect), receiving, by the load balancer, a second request from a second computing device, the second request comprising second identifier data identifying a second collaborative editing session; determining, by the load balancer, that the second identifier data is associated with the second collaborative editing session; determining, by the load balancer, that the second collaborative editing session is assigned to a second node; and sending the second request to the second node.

In accordance with a 4th example aspect of the present disclosure, which may be used in combination with any one or more of other aspects described herein (e.g., the 3rd aspect), performing a lookup, by the load balancer, using the second identifier data as a search query; and receiving data identifying the second node in response to the search query, wherein the determining that the second collaborative editing session is assigned to the second node comprises receiving the data identifying the second node in response to the search query.

In accordance with a 5th example aspect of the present disclosure, which may be used in combination with any one or more of other aspects described herein (e.g., the 1st aspect), wherein the first identifier data is included in a uniform resource locator (URL) of the first request.

In accordance with a 6th example aspect of the present disclosure, which may be used in combination with any one or more of other aspects described herein (e.g., the 1st aspect), wherein the first identifier data is included in a packet header of the first request.

In accordance with a 7th example aspect of the present disclosure, which may be used in combination with any one or more of other aspects described herein (e.g., the 1st aspect), wherein the first identifier data comprises a unique identifier data distinguishing the first collaborative editing session from among other collaborative editing sessions.

In accordance with a 8th example aspect of the present disclosure, which may be used in combination with any one or more of other aspects described herein (e.g., the 1st aspect), wherein the load balancer is configured to determine respective associations between collaborative editing sessions and compute nodes on which the collaborative editing sessions are executing.

In accordance with a 9th example aspect of the present disclosure, which may be used in combination with any one or more of other aspects described herein (e.g., the 1st aspect), receiving, by the load balancer, a second request from the first computing device, the second request comprising second identifier data identifying a second collaborative editing session; determining, by the load balancer, that the second identifier data is associated with a second node of the first cluster of compute nodes; and sending the second request to the second node.

In accordance with a 10th example aspect of the present disclosure, which may be used in combination with any one or more of other aspects described herein (e.g., the 1st aspect), wherein a plurality of nodes of the first cluster each execute respective collaborative editing sessions.

Aspects of the subject matter described herein may be useful alone or in combination with one or more other aspects described herein. In an 11th example aspect of the present disclosure, a system comprises a first cluster of compute nodes comprising a first node, wherein the first node is configured to execute a first collaborative editing session; a load balancer executing on the first cluster of compute nodes, the load balancer configured to: receive a first request from a first computing device, the first request comprising first identifier data identifying the first collaborative editing session; determine that the first identifier data is associated with the first collaborative editing session; determine that the first collaborative editing session is assigned to the first node; and send the first request to the first node.

In accordance with a 12th example aspect of the present disclosure, which may be used in combination with any one or more of other aspects described herein (e.g., the 11th aspect), wherein the load balancer is further configured to: receive a second request from a second computing device, the second request comprising the first identifier data identifying the first collaborative editing session; and send the second request to the first node.

In accordance with a 13th example aspect of the present disclosure, which may be used in combination with any one or more of other aspects described herein (e.g., the 11th aspect), wherein the load balancer is further configured to: receive a second request from a second computing device, the second request comprising second identifier data identifying a second collaborative editing session; determine that the second identifier data is associated with the second collaborative editing session; determine that the second collaborative editing session is assigned to a second node; and send the second request to the second node.

In accordance with a 14th example aspect of the present disclosure, which may be used in combination with any one or more of other aspects described herein (e.g., the 13th aspect), wherein the load balancer is further configured to: perform a lookup using the second identifier data as a search query; and receive data identifying the second node in response to the search query, wherein the determination that the second collaborative editing session is assigned to the second node comprises receiving the data identifying the second node in response to the search query.

In accordance with a 15th example aspect of the present disclosure, which may be used in combination with any one or more of other aspects described herein (e.g., the 11th aspect), wherein the first identifier data is included in a uniform resource locator (URL) of the first request.

In accordance with a 16th example aspect of the present disclosure, which may be used in combination with any one or more of other aspects described herein (e.g., the 11th aspect), wherein the first identifier data is included in a packet header of the first request.

In accordance with a 17th example aspect of the present disclosure, which may be used in combination with any one or more of other aspects described herein (e.g., the 11th aspect), wherein the first identifier data comprises a unique identifier data distinguishing the first collaborative editing session from among other collaborative editing sessions.

In accordance with a 18th example aspect of the present disclosure, which may be used in combination with any one or more of other aspects described herein (e.g., the 11th aspect), wherein the load balancer is configured to determine respective associations between collaborative editing sessions and compute nodes on which the collaborative editing sessions are executing.

In accordance with a 19th example aspect of the present disclosure, which may be used in combination with any one or more of other aspects described herein (e.g., the 11th aspect), wherein the load balancer is further configured to: receive a second request from the first computing device, the second request comprising second identifier data identifying a second collaborative editing session; determine that the second identifier data is associated with a second node of the first cluster of compute nodes; and send the second request to the second node.

In accordance with a 20th example aspect of the present disclosure, which may be used in combination with any one or more of other aspects described herein (e.g., the 11th aspect), wherein the first cluster further comprises a plurality of other compute nodes, wherein the plurality of other compute nodes each execute respective collaborative editing sessions.

Aspects of the subject matter described herein may be useful alone or in combination with one or more other aspects described herein. In an 21st example aspect of the present disclosure, a computing device comprises: at least one processor; and non-transitory computer-readable memory storing instructions that, when executed by the at least one processor, cause the at least one processor to: send a first request to connect to a first collaborative editing session executing on a first cluster of compute nodes, the first request comprising first identifier data identifying the first collaborative editing session, wherein a load balancer executing on the first cluster of compute nodes is configured to determine a first node on which the first collaborative editing session is executing based at least in part on the first identifier data; and receive first response data from the first node indicating that communication with the first collaborative editing session has been established.

In accordance with a 22nd example aspect of the present disclosure, which may be used in combination with any one or more of other aspects described herein (e.g., the 21st aspect), wherein the load balancer is configured to: perform a lookup using the first identifier data as a search query; and receiving data identifying the first node in response to the search query, wherein the determining that the first node is executing the first collaborative editing session comprises receiving the data identifying the first node in response to the search query.

In accordance with a 23rd example aspect of the present disclosure, which may be used in combination with any one or more of other aspects described herein (e.g., the 21st aspect), the non-transitory computer-readable memory storing further instructions that, when executed by the at least one processor, are further configured to cause the at least one processor to generate a uniform resource locator (URL) for the first request, the URL comprising the first identifier data.

In accordance with a 24th example aspect of the present disclosure, which may be used in combination with any one or more of other aspects described herein (e.g., the 21st aspect), the non-transitory computer-readable memory storing further instructions that, when executed by the at least one processor, are further configured to generate the first request comprising the first identifier data in a packet header.

In accordance with a 25th example aspect of the present disclosure, which may be used in combination with any one or more of other aspects described herein (e.g., the 21st aspect), wherein the first identifier data comprises a unique identifier data distinguishing the first collaborative editing session from among other collaborative editing sessions.

In accordance with a 26th example aspect of the present disclosure, which may be used in combination with any one or more of other aspects described herein (e.g., the 21st aspect), wherein the load balancer is configured to determine respective associations between collaborative editing sessions and compute nodes on which the collaborative editing sessions are executing.

In accordance with a 27th example aspect of the present disclosure, which may be used in combination with any one or more of other aspects described herein (e.g., the 21st aspect), the non-transitory computer-readable memory storing further instructions that, when executed by the at least one processor, are further configured to cause the at least one processor to: send a second request, the second request to connect to a second collaborative editing session executing on the first cluster of compute nodes, the second request comprising second identifier data identifying the second collaborative editing session, wherein the load balancer is configured to determine that the second identifier data is associated with a second node of the first cluster of compute nodes; and receive second response data from the second node indicating that communication with the second collaborative editing session has been established.

Aspects of the subject matter described herein may be useful alone or in combination with one or more other aspects described herein. In an 28th example aspect of the present disclosure, a system comprises a means for executing a first collaborative editing session at a first node of a first cluster of compute nodes; a means for receiving a first request from a first computing device, the first request comprising first identifier data identifying the first collaborative editing session; a means for determining that the first identifier data is associated with the first node; and a means for sending the first request to the first node.

In accordance with a 29th example aspect of the present disclosure, which may be used in combination with any one or more of other aspects described herein (e.g., the 28th aspect), a means for receiving a second request from a second computing device, the second request comprising the first identifier data identifying the first collaborative editing session; and sending the second request to the first node.

In accordance with a 30th example aspect of the present disclosure, which may be used in combination with any one or more of other aspects described herein (e.g., the 28th aspect), a means for receiving a second request from a second computing device, the second request comprising second identifier data identifying a second collaborative editing session; a means for determining a second node that is executing the second collaborative editing session; and a means for sending the second request to the second node.

In accordance with a 31st example aspect of the present disclosure, which may be used in combination with any one or more of other aspects described herein (e.g., the 28th aspect), a means for performing a lookup using the second identifier data as a search query; and a means for receiving data identifying the second node in response to the search query, wherein the determining that the second node is executing the second collaborative editing session comprises receiving the data identifying the second node in response to the search query.

Aspects of the subject matter described herein may be useful alone or in combination with one or more other aspects described herein. In an 32nd example aspect of the present disclosure, a method comprises deploying a first collaborative editing session on a first node of a first cluster of compute nodes; sending first data to a load balancer of the first cluster of compute nodes, the first data including first resource identifier data identifying the first collaborative editing session from among other collaborative editing sessions and associating the first collaborative editing session with the first node; deploying a second collaborative editing session on a second node of the first cluster of compute nodes; and sending second data to the load balancer, the second data including second resource identifier data identifying the second collaborative editing session from among other collaborative editing sessions and associating the second collaborative editing session with the second node.

In accordance with a 33rd example aspect of the present disclosure, which may be used in combination with any one or more of other aspects described herein (e.g., the 32nd aspect), receiving, by the load balancer, a first request from a first computing device to establish communication with the first collaborative editing session; determining, by the load balancer, that the first request comprises the first resource identifier data; and sending the first request to the first node.

In accordance with a 34th example aspect of the present disclosure, which may be used in combination with any one or more of other aspects described herein (e.g., the 32nd aspect), receiving, by the load balancer, a second request from the first computing device to establish communication with a second collaborative editing session; determining, by the load balancer, that the second request comprises the second resource identifier data; and sending the second request to the second node.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
executing a first collaborative editing session at a first node of a first cluster of compute nodes;
receiving, by a load balancer executing on the first cluster of compute nodes, a first request from a first computing device, the first request comprising first identifier data;
performing a lookup by the load balancer by querying a lookup table using the first identifier data;
determining, by the load balancer, that the first identifier data is associated with the first collaborative editing session in the lookup table;
determining, by the load balancer using the first identifier data, that the first collaborative editing session is executing on the first node;
determining, by the load balancer using the first identifier data, first data stored in the lookup table in association with the first identifier data, the first data identifying a first websocket;
sending, by the load balancer, the first request to the first node via the first websocket;
changing a state of the first collaborative editing session executing on the first node in response to the first request;
determining a replica of the first collaborative editing session executing on a second node in response to the lookup using the first identifier data;
determining, by the load balancer using the first identifier data, second data stored in the lookup table in association with the first identifier data, the second data identifying a second websocket;
determining a message broker of an asynchronous communication protocol, the message broker configured in communication with the first node and the second node;
sending, by the first collaborative editing session, a first message to the message broker, the first message comprising the second data identifying the second websocket;
receiving, by the second node, the first message from the message broker via the second websocket; and
changing a state of the replica of the first collaborative editing session executing on the second node in response to the first message.

2. The method of claim 1, further comprising:
receiving, by the load balancer, a second request from a second computing device, the second request comprising the first identifier data; and
sending the second request to the first node via the first websocket.

3. The method of claim 1, further comprising:
receiving, by the load balancer, a second request from a second computing device, the second request comprising second identifier data;
performing a second lookup by the load balancer by querying the lookup table using the second identifier data;
determining, by the load balancer, that the second identifier data is associated with the second collaborative editing session in the lookup table;
determining, by the load balancer using the second identifier data, that the second collaborative editing session is executing on the second node;
determining, by the load balancer using the second identifier data, that the second data is stored in the lookup table in association with the second identifier data, the second data identifying the second websocket;

sending the second request to the second node via the second websocket;
changing a state of the second collaborative editing session executing on the second node;
determining a replica of the second collaborative editing session executing on a third node in response to the lookup using the second identifier data;
determining, by the load balancer using the second identifier data, third data stored in the lookup table in association with the second identifier data, the third data identifying a third websocket;
sending, by the second collaborative editing session, a second message to the message broker, the second message comprising the third data identifying the third websocket;
sending, by the message broker, the second message to the third node using the third websocket; and
changing a state of the replica of the second collaborative editing session executing on the third node in response to the second message.

4. The method of claim 1, wherein the first identifier data is included in a uniform resource locator (URL) of the first request.

5. The method of claim 1, wherein the first identifier data is included in a packet header of the first request.

6. The method of claim 1, wherein the first identifier data comprises a unique identifier data distinguishing the first collaborative editing session from among other collaborative editing sessions.

7. The method of claim 1, wherein the load balancer is configured to determine respective associations between collaborative editing sessions and compute nodes on which the collaborative editing sessions are executing.

8. The method of claim 1, further comprising:
receiving, by the load balancer, a second request from the first computing device, the second request comprising second identifier data identifying a second collaborative editing session;
determining, by the load balancer, that the second identifier data is associated with the second node of the first cluster of compute nodes; and
sending the second request to the second node.

9. The method of claim 1, wherein a plurality of nodes of the first cluster each execute respective collaborative editing sessions.

10. A system comprising:
a first cluster of compute nodes comprising a first node, wherein the first node is configured to execute a first collaborative editing session;
a load balancer executing on the first cluster of compute nodes, the load balancer configured to:
receive a first request from a first computing device, the first request comprising first identifier data;
perform a lookup by querying a lookup table using the first identifier data;
determine that the first identifier data is associated with the first collaborative editing session in the lookup table;
determine, using the first identifier data, that the first collaborative editing session is executing on the first node;
determine, using the first identifier data, first data stored in the lookup table in association with the first identifier data, the first data identifying a first websocket;
send the first request to the first node via the first websocket;
change a state of the first collaborative editing session executing on the first node in response to the first request;
determine a replica of the first collaborative editing session executing on a second node in response to the lookup using the first identifier data;
determine, using the first identifier data, second data stored in the lookup table in association with the first identifier data, the second data identifying a second websocket;
determine a message broker of an asynchronous communication protocol, the message broker configured in communication with the first node and the second node;
send, by the first collaborative editing session, a first message to the message broker, the first message comprising the second data identifying the second websocket;
receive, by the second node, the first message from the message broker via the second websocket; and
change a state of the replica of the first collaborative editing session executing on the second node in response to the first message.

11. The system of claim 10, wherein the load balancer is further configured to:
receive a second request from a second computing device, the second request comprising the first identifier data; and
send the second request to the first node via the first websocket.

12. The system of claim 10, wherein the load balancer is further configured to:
receive, by the load balancer, a second request from a second computing device, the second request comprising second identifier data;
perform a second lookup by the load balancer by querying the lookup table using the second identifier data;
determine that the second identifier data is associated with the second collaborative editing session in the lookup table;
determine, using the second identifier data, that the second collaborative editing session is executing on the second node;
determine, using the second identifier data, that the second data is stored in the lookup table in association with the second identifier data, the second data identifying the second websocket;
send the second request to the second node via the second websocket;
change a state of the second collaborative editing session executing on the second node;
determine a replica of the second collaborative editing session executing on a third node in response to the lookup using the second identifier data;
determine, using the second identifier data, third data stored in the lookup table in association with the second identifier data, the third data identifying a third websocket;
send, by the second collaborative editing session, a second message to the message broker, the second message comprising the third data identifying the third websocket;
send, by the message broker, the second message to the third node using the third websocket; and
change a state of the replica of the second collaborative editing session executing on the third node in response to the second message.

13. The system of claim 10, wherein the first identifier data is included in a uniform resource locator (URL) of the first request.

14. The system of claim 10, wherein the first identifier data is included in a packet header of the first request.

15. The system of claim 10, wherein the first identifier data comprises a unique identifier data distinguishing the first collaborative editing session from among other collaborative editing sessions.

16. A method comprising:
deploying a first collaborative editing session on a first node of a first cluster of compute nodes;
sending first data to a load balancer of the first cluster of compute nodes, the first data including first resource identifier data identifying the first collaborative editing session from among other collaborative editing sessions and associating the first collaborative editing session with the first node;
deploying a second collaborative editing session on a second node of the first cluster of compute nodes;
sending second data to the load balancer, the second data including second resource identifier data identifying the second collaborative editing session from among other collaborative editing sessions and associating the second collaborative editing session with the second node;
changing a state of the first collaborative editing session executing on the first node in response to a first request;
determining a replica of the first collaborative editing session executing on the second node;
determining, using the first resource identifier data, a first websocket associated with the first resource identifier data and the second node;
determining a message broker of an asynchronous communication protocol, the message broker configured in communication with the first node and the second node;
sending, by the first collaborative editing session, a first message to the message broker, the first message comprising data identifying the first websocket;
receiving, by the second node, the first message from the message broker via the second websocket; and
changing a state of the replica of the first collaborative editing session executing on the second node in response to the first message.

17. The method of claim 16, further comprising:
receiving, by the load balancer, a second request from a first computing device to establish communication with the first collaborative editing session;
determining, by the load balancer, that the second request comprises the first resource identifier data; and
sending the second request to the first node.

18. The method of claim 17, further comprising:
receiving, by the load balancer, a third request from the first computing device to establish communication with the second collaborative editing session;
determining, by the load balancer, that the third request comprises the second resource identifier data; and
sending the second request to the second node.

19. The method of claim 1, further comprising storing the first identifier data in the lookup table in association with a first network path and a first cluster instance identifier.

* * * * *